Patented Oct. 15, 1940

2,217,905

UNITED STATES PATENT OFFICE 2,217,905

THERAPEUTIC AGENT

Charles Hoffman, Scarsdale, Gaston Dalby, New York, and Thomas R. Schweitzer, South Ozone Park, N. Y., assignors to Ward Baking Company, New York, N. Y., a corporation of New York No Drawing. Application January 13, 1937, Serial No. 120,380

15 Claims. (Cl. 167—58)

Our invention relates to a therapeutic agent adapted to inhibit the growth of pathogenic fungi and capable of alleviating conditions arising from the infection of the skin and the diseases resulting therefrom.

Diseases of the type referred to are caused by the presence and growth of fungus organisms in the retained secretions in the skin pores, or other media, in or at the surface of the skin. These various diseases include the various forms of acne, alopecia seborrhoeica (dandruff), onychomycosis (fungus disease of the toe or finger nail), the various forms of eczema, favus (a chronic fungus disease related to ringworm), the lichen infections (papular skin diseases, or those forming papules or nodules), pruritus (itch), the numerous varieties of tinea trichophytina (true ringworm and athlete's foot), tinea barbae (barber's itch), tinea versicolor (a local fungus disease occurring chiefly on the trunk), etc.

Heretofore the treatment of such diseases has been by the application of antiseptics, such as mercury compounds, phenol, boric acid, salicylic acid, zinc ointments, chlorine compounds, etc., or by the use of bacteria destroying rays, such as ultra-violet and X-ray. The known antiseptics have the disadvantage that if sufficiently toxic to destroy fungus organisms they are irritating to the skin and tend to prevent the natural function thereof. Radiation treatments are moderately effective only in certain types of conditions and require special apparatus, or visits to a physician or clinic.

It is the object of the invention to provide a therapeutic agent which inhibits or stops the growth of, or kills, fungus organisms which are the cause of skin diseases, without irritating the skin.

Another object of the invention is the provision of an effective, non-irritating therapeutic agent which can be embodied in various forms such as powders, creams, ointments, etc., adapted therefore to be applied readily under varying conditions to the affected parts.

Another object of the invention is the provision of a method of rendering innocuous pathogenic fungi infecting the skin of higher animals and thereby permitting the skin to resume its natural condition.

We have discovered that propionic acid or propionates in a medium having an acidity or pH value of between 5.3 and 5.7 will effectively inhibit the growth of or destroy fungus organisms. This pH value corresponds to an acidity approximating, or only slightly differing from, that normally present on the skin itself. Consequently, there is no irritation of the skin because of this slightly acid condition of the therapeutic agent. A relatively few applications to the affected parts generally results in elimination of the cause of the disease, i. e., fungus organisms, and the skin resumes its natural condition.

Propionic acid can be partially neutralized by suitable alkaline reagents to afford the desired pH range. The propionates are neutral or approximately neutral salts, and have no irritating or other effects on the skin substance. Suitable acid substances can be added thereto to afford the desired acidity. While we do not wish to be limited to any particular theory, we believe that the acid radical of propionic acid, $CH_3.CH_2.CO_2H$, is the effective inhibiting agent which prevents the growth of fungus organisms. The effectiveness increases with acidity, but to avoid irritation it is desirable to limit acidity of material adapted for skin applications to not more than pH 5.3.

In carrying out the invention, we prefer to employ propionates, for example, of the alkali metals, such as potassium, sodium, lithium or ammonium propionate, or the propionates of the alkaline earth metals, such as those of calcium, barium, strontium, etc. Propionates of the heavier metals, such as zinc, etc., might be employed but are not in general as convenient to use as the alkali metal or alkaline earth metal propionates. The substituted propionates such as compounds of bromopropionic and chloropropionic acids are just as effective as compounds of propionic acid.

To afford the desired acidity, any suitable acidifying material may be used in the therapeutic agent, for example, if a liquid medium be employed, very dilute mineral or organic acids or acid salts might be employed. Inasmuch as the addition of the acid or acid salt is only for the purpose of providing the proper pH value, there is available a wide choice of acidifying agents. The selection of any particular acidifying agent may, therefore, be determined by considerations of convenience or of the particular conditions of use. Suitable organic acids are propionic, citric, tartaric, etc. Acid salts such as acid tartrates, citrates, sulphates and phosphates may be used. Mineral acids such as hydrochloric, and sulphuric are suitable. The foregoing examples are not intended to limit the generality of the invention.

The therapeutic agent may be in the form of a solid powder, a paste or salve, or a liquid solution or emulsion. When the agent is used in powdered form it may consist of a powdered propionate, such as a propionate of the alkali or alkaline earth metals, and a powdered solid acid such that when it is dissolved by the moisture of the skin it will therefore have a pH value of between 5.3 and 5.7. There is a wide range of organic acids which have a solubility and ionization constant that would give a pH value in the required range. The selection of any particular acid for this purpose would, therefore, be a matter of choice, determined by the convenience of use, availability, etc. A solid acid, such as citric acid, is an example of an acidifying medium suitable for this purpose. In order to dilute the mixture to the proper consistency, or to add other agents, the mixture of powdered propionate and acid may be admixed with talc, or other toilet powders or powdered materials.

In the event that the agent is to be used in the form of a paste or salve, the propionate and acid, both of which may be powdered solids in intimate mixture, may be mixed into a pasty medium, such as cold cream, petroleum jelly or other pastes. When the agent is used in a paste, such as cold cream which contains water, it may exist partly in solution in the water. In this case the aqueous constituent would have a pH value of between 5.3 and 5.7.

When the agent is used in the form of a solution or lotion, the propionic acid may be dissolved in water and the acidifying agent added until the pH value is between 5.3 and 5.7 or, a neutralizing agent, such as sodium hydroxide solution, may be added until the proper pH value is obtained.

Examples of the therapeutic agent of our invention are as follows:

*Example I*

85 parts of finely divided sodium propionate is intimately mixed with 15 parts of dry solid citric acid. The pH value of the resulting mixture when applied to the skin would be about 5.5. This mixture of sodium propionate and citric acid may be mixed to the extent of about 5% to 10% with talcum powder, or other toilet powder.

*Example II*

A mixture of a propionate and a dry organic acid, such as citric acid, is mixed with a paste-like base such as cold cream, cold cream consisting of an emulsified mixture of fat and water. The pH value of this mixture will be between 5.3 and 5.7.

*Example III*

A solution of propionic acid in a mixture of alcohol and water and of a concentration of between 5% and 10% of acid, is neutralized with sodium hydroxide until it has a pH value of between 5.3 and 5.7. Or, the chemical equivalent of a propionate and an organic acid may be dissolved, either admixed or separately, in an aqueous medium in such proportions as to produce a pH value between 5.3 and 5.7.

It is evident that examples could be multiplied because the maintenance of desired acidity can be accomplished with a variety of reagents and the therapeutic agent can be incorporated with diluents and vehicles of many kinds. The essential feature of the invention is the inclusion of propionic acid and propionates in compositions with an acidic range corresponding to a pH value of between 5.3 and 5.7 adapted for application to inhibit the growth of or to destroy pathogenic fungi.

The method of rendering innocuous pathogenic fungi on or in the skin of higher animals consists of applying to the affected parts the therapeutic agent in one or another of the several forms described. The particular form or medium of application will depend upon the condition and nature of the affected parts. Applications of the selected form of the agent will be repeated until relief is afforded and the diseased condition disappears.

Through the invention as described, we have provided a therapeutic agent capable of destroying disease producing growths of the type mentioned above, and which is entirely harmless toward the skin. The propionates may be absorbed by the system without danger of any deleterious results, and acids may be used which are entirely harmless. Many of such acids, such as citric and propionic acid, may be taken into the system in much larger quantities than present in our therapeutic agent without danger of injury.

Various changes may be made in the details of the compositions described without departing from the invention or sacrificing the advantages thereof.

What we claim is:

1. A therapeutic agent adapted to inhibit the growth of pathogenic fungi and comprising the acid radical of propionic acid in a modifying medium affording an acidity range which is substantially non-irritating to the skin.

2. A therapeutic agent adapted to inhibit the growth of pathogenic fungi and comprising the acid radical of a halogen substituted propionic acid in a modifying medium affording an acidity range which is substantially non-irritating to the skin.

3. A therapeutic agent adapted to inhibit the growth of pathogenic fungi and comprising the acid radical of propionic acid in a modifying medium affording an acidity range between pH 5.3 and pH 5.7.

4. A therapeutic agent for application to the skin which comprises a mixture of a propionate and an acid having in solution a pH value of between 5.3 and 5.7.

5. A therapeutic agent for the skin which comprises propionic acid in a medium having a pH value of between 5.3 and 5.7.

6. A therapeutic agent for the skin which comprises a dry mixture of a solid propionate and a solid acid which in saturated solution gives a pH value of between 5.3 and 5.7.

7. A therapeutic agent adapted to inhibit the growth of pathogenic fungi comprising a mixture of a propionate and an acid agent, said mixture having a pH value of about 5.3 to 5.7.

8. A therapeutic agent for the skin comprising a solution of a propionate in an aqueous medium having a pH value of 5.3 to 5.7.

9. A therapeutic agent for the skin which comprises a paste containing a propionate and an acid of a pH value of 5.3 to 5.7.

10. A therapeutic agent for the skin which comprises a mixture of a propionate and a weak organic acid, said mixture having a pH value of between 5.3 and 5.7.

11. A therapeutic agent for the skin which comprises a mixture of a propionate and tartaric acid, the tartaric acid being present in such amount as to give a pH value of between 5.3 and 5.7, 12. A therapeutic agent for the skin which comprises a mixture of propionate and propionic acid in proportions to give a pH value of between 5.3 and 5.7.

13. A therapeutic agent adapted to inhibit the growth of pathogenic fungi comprising a dilute powder having admixed therewith a dry propionate and a dry powdered acid in proportion to give a pH value of between 5.3 and 5.7.

14. The method of rendering innocuous pathogenic fungi on or in the skin of higher animals which comprises applying to the surface of the infected part a therapeutic agent having as an active constituent the acid radical of propionic acid in a medium the pH value of which is between 5.3 and 5.7.

15. The method of rendering innocuous pathogenic fungi on or in the skin of higher animals which comprises applying to the surface of the infected part a therapeutic agent having as an active constituent a propionate of a metal in a medium the pH value of which is between 5.3 and 5.7.

CHARLES HOFFMAN.
GASTON DALBY.
THOMAS R. SCHWEITZER.